Aug. 14, 1945.  G. H. SCHANZ  2,382,177
APPARATUS FOR MAKING COMPOSITE STRIPS
Filed Oct. 15, 1941
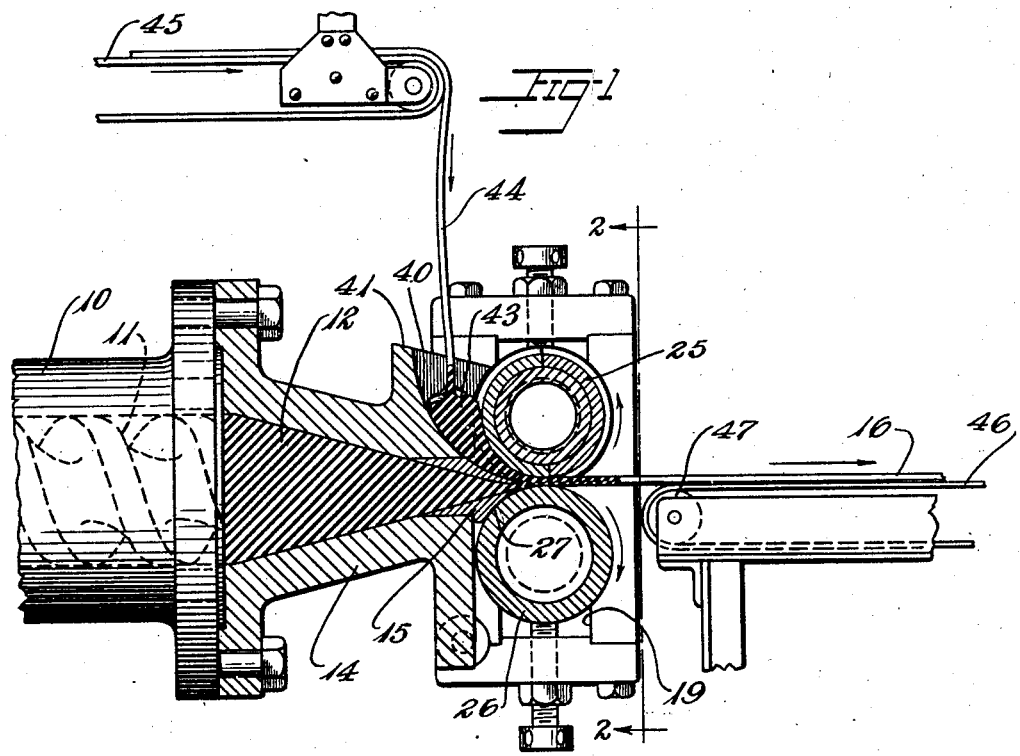
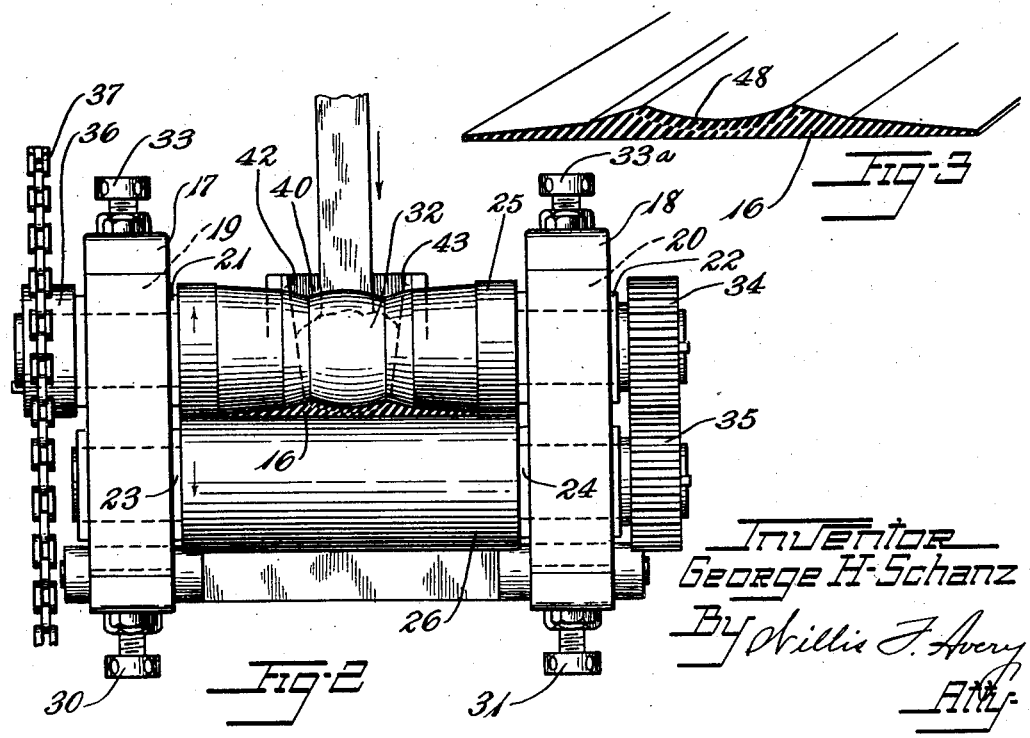
Inventor
George H. Schanz
By Willis F. Avery
Atty.

Patented Aug. 14, 1945

2,382,177

UNITED STATES PATENT OFFICE 2,382,177

APPARATUS FOR MAKING COMPOSITE STRIPS

George H. Schanz, Akron, Ohio, assignor to The B. F. Goodrich Company, New York, N. Y., a corporation of New York Application October 15, 1941, Serial No. 415,058

4 Claims. (Cl. 18—11)

This invention relates to the manufacture of composite strips of plastic material and is especially useful in the manufacture of tread slabs of rubber composition for use in the manufacture of pneumatic tires.

Heretofore in the manufacture of composite strips for use in building pneumatic tires and other articles, it has been proposed to calender or extrude the strip elements separately and then to assemble and unite the strip elements. Adhesion of the plastic elements is defeated by the presence of dust or moisture, and such prior procedure has permitted moisture due to handling of the strips or dust to lodge between the strip elements, preventing proper adhesion. It has also been difficult to align the strip elements properly with respect to each other. In forming composite strips of some compositions it has been found difficult to form the materia in a strip of uniform volume owing to the fact that oversize zones of the parts often coincide in the assembly and undersize zones often come together also.

The present invention aims to overcome the foregoing and other difficulties and to provide an improved apparatus and method of procedure and a uniformly high quality product.

The principal objects of the invention are to provide an apparatus for making a composite strip uniform in dimensions with its elements in proper alignment, to provide good adhesion of the elements to each other, to eliminate dust and moisture from the interface, to prevent overheating of the composition and to provide facility of manufacture.

These and other objects will appear from the following description and the accompanying drawing.

Of the drawing:

Fig. 1 is an elevation, partly in longitudinal cross-section and partly broken away, of apparatus constructed in accordance with and embodying the invention.

Fig. 2 is an end elevation thereof looking at the delivery side of the forming rolls, the tread slab being shown in cross section, the view being taken on line 2—2 of Fig. 1.

Fig. 3 is a perspective view of a composite tread slab produced by the method and apparatus of the invention.

In accordance with the invention a mass of one plastic composition is extruded through a stock-distributing die directly into the nip of a pair of forming and pressing rollers constituting the die for giving the final profile, and a second plastic composition is fed between one of the forming rollers and a stationary surface and there shaped and brought into direct contact with the first composition while the compositions are in a warm plastic state. The two compositions in superimposed relation are united into strip form by the roller die, so that the united composite strip issues from such rolls in the final shape and in highly uniform volume.

Referring to the drawing, the numeral 10 designates the cylinder of an extruding machine in which a power driven screw 11 is rotated to advance a plastic composition 12 through a converging opening of a die head 14. A distributing die 15 having an opening of such size and shape as to produce the desired volume distribution of the stock for the base strip 16 of the tread slab is mounted at the delivery end of the die head. The die is not necessarily the same shape as the slab base is in cross section since plastic material thickens after leaving the die and such thickening is dependent upon the plasticity of the composition, the amount of pressure applied, the temperature of the material, and the friction of the die. Also, the die need not necessarily provide the final profile shape of the base strip 16, the principal purpose of this die being to effect the desired volume distribution of the stock.

Mounted at the delivery end of the die head and supported thereby are a pair of spaced-apart roll housings 17, 18 having guide slots 19, 20 for slideably receiving roll bearings 21, 22, 23, 24 in which there is rotatably supported a roller die comprising a pair of forming rolls 25, 26, mounted in parallel relation. The lower roll 26 has a plain face and the die 15 has an arcuate surface 27 conforming to the curvature of the roll and adapted to fit closely thereagainst near the nip of the rolls to prevent passage of plastic material therebetween. Bearings 23, 24 in which roll 26 is journaled are supported by adjusting screws 30, 31 threaded through the roll housings so that the roll 26 may be adjusted to contact with the surface 27.

The upper forming roll 25 has its face 32 contoured to provide the upper profile of the desired slab or strip. This roll is held against roll 26 by adjusting screws 33, 33a threaded through the housings and impinging against its bearings so that by adjustment of the screws 33, 33a, the thickness of the slab may be adjusted.

Rolls 25, 26 have gears 34, 35 fixed respectively to them and these gears engage each other in meshed relation to cause these rolls to rotate in unison. Roll 25 also has a sprocket 36 fixed thereto which is adapted to be driven by a chain 37 from a motor or other source of power (not shown). The power source is of the variable speed type so that the roller die may be driven at the most effective speed with relation to the delivery speed of the extruding head.

The extruding head 14 and the distributing die 15 are formed to provide a stationary wall 41 of a converging throat 40 between such wall and the face of the roll 25 which supplies a moving wall to the throat. End walls 42, 43 extending from the wall 41 fit against the surface of roll 25.

To provide the cap strip portion 42 of the slab, a bank 43 of plastic material is fed into the throat 40 and is forced by the roll 25 between it and the stationary surface 41, the pressure on the plastic material constantly increasing as it approaches the nip of the rolls. It is thus progressively formed to shape and is united to the underlying strip 16 by pressure of the rolls 24, 25.

The plastic material for providing the bank 43 may be supplied from an extruding machine, calender, or other source (not shown) in strip form, the strip 44 being delivered to the throat 40 by a conveyor belt 45.

To provide against overheating of the plastic material due to friction of the rolls 25, 26 and the walls of the throat, rolls 25, 26 may be hollow and cold water or other cooling fluid may be circulated therethrough.

The completed slab may be delivered from the rolls 25, 26 onto a conveyor belt 46 passing over a pulley 47 at the delivery side of the rolls.

In preparing a slab of plastic material, such as unvulcanized rubber, synthetic rubber-like products, or other suitable plastic material, a plastic composition suitable for the base strip 16 is fed into the extruder head 14 by means of the screw 11 and is distributed as to volume by the die 15 which delivers it directly into the nip of the rolls 25, 26, of the roller die. Plastic material suitable for the cap strip 48 is simultaneously fed into the throat 40 and provides a bank 43 of plastic material which is formed between the face of roll 25 and the arcuate surface 40 to the desired shape and into direct engagement with the strip 16. As both strips are of warm soft material they are forced into intimate surface engagement with each other by pressure of the rolls 25, 26 before dust or moisture can collect therebetween and while the materials are in a tacky condition. An important advantage of the apparatus described herein is that the roller die, acting in the formation of both parts of the slab and also in the uniting of them, serves to equalize the composite strip as to volume, and produces high uniformity of the strip in respect to volume and profile, and also high and uniform density.

While the invention has been illustrated as applied to manufacture of a tread slab suitable for use on pneumatic tires, slabs or strips of other plastic materials for other purposes may be made by use of the invention.

Variations may be made without departing from the scope of the invention as it is defined by the following claims:

I claim:

1. Apparatus for forming and uniting a plurality of plastic materials in composite strip form, said apparatus comprising a pair of rotatable forming and pressing rolls, at least one of said rolls having a contoured strip-shaping face, means for feeding plastic material to the nip of the rolls, and means for supplying another plastic material upon a face of the first said plastic material and against the contoured roll and into the nip of the rolls for forming the same and pressing it into composite face to face relation with the first plastic material.

2. Apparatus for forming and uniting a plurality of plastic materials in composite strip form, said apparatus comprising means for extruding one of the materials including a roller die comprising a pair of rotatable forming and pressing rolls located at the delivery position of the extruding means, one of said rolls having a contoured strip-shaping face and means for forming a second plastic material and feeding it into intimate face to face engagement with the first plastic material at the nip of the rolls, said last-named means comprising an open-sided throat having as a wall thereof a face of one of the forming rolls.

3. Apparatus for forming and uniting a plurality of plastic materials to provide a composite strip, said apparatus comprising an extruding die for extruding one of the materials in strip form, a pair of forming and pressing rolls located at the delivery orifice of the die, one of said rolls having a contoured strip-shaping face, means for rotating the rolls, and means for feeding a second plastic material into intimate face to face engagement with the extruded strip at the nip of the rolls, said last-named means comprising an open-sided throat having as a wall thereof a face of the contoured roll.

4. Apparatus for forming and uniting a plurality of plastic materials in composite face to face strip form, said apparatus comprising extruding means including a head having a chamber, a roller die at the delivery end of said head comprising a pair of rolls one of which has a contoured strip-forming face a second chamber in said head having one of said rolls as a wall thereof, both said chambers leading to the same position with respect to the nip of said rolls, and means for adjusting one of said rolls toward and away from the other.

GEORGE H. SCHANZ.